(12) United States Patent
Bonebakker

(10) Patent No.: US 7,360,043 B1
(45) Date of Patent: Apr. 15, 2008

(54) METHOD AND APPARATUS FOR EFFICIENTLY DETERMINING RANK IN AN LRU LIST

(75) Inventor: Jan L. Bonebakker, Mountain View, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 294 days.

(21) Appl. No.: 11/205,930

(22) Filed: Aug. 17, 2005

(51) Int. Cl.
*G06F 12/00* (2006.01)

(52) U.S. Cl. ............... 711/160; 711/136; 711/154
(58) Field of Classification Search ........ 711/160, 711/136, 154
See application file for complete search history.

(56) References Cited

U.S. PATENT DOCUMENTS

| | | | | |
|---|---|---|---|---|
| 6,141,731 | A * | 10/2000 | Beardsley et al. | 711/136 |
| 6,393,525 | B1 * | 5/2002 | Wilkerson et al. | 711/136 |
| 6,748,494 | B1 * | 6/2004 | Yashiro | 711/133 |
| 6,963,874 | B2 * | 11/2005 | Kasriel et al. | 707/10 |
| 7,107,406 | B2 * | 9/2006 | Kurasugi | 711/137 |
| 2005/0171937 | A1 * | 8/2005 | Hughes et al. | 707/3 |

OTHER PUBLICATIONS

Publication: "Efficient (Stack) Algorithms for Analysis of Write-Back and Sector Memories" by Thompson and Smith, ACM Transactions on Computer Systems, vol. 7, No. 1, Feb. 1989, pp. 78-117.

* cited by examiner

*Primary Examiner*—Stephen C. Elmore
(74) *Attorney, Agent, or Firm*—Park, Vaughan & Fleming

(57) ABSTRACT

One embodiment of the present invention provides a system that manages an LRU list such that the rank, or position, of data records in the sequence can be determined efficiently. The system initializes an index field in each record to the record's initial rank. When a record is accessed, the system moves it to the beginning of the LRU list and appends the value of the record's index field to a "change list." The system then sets the record's index field to zero. The change list effectively tracks the records accessed since initialization, and combined with the records' index fields can be used to efficiently compute the rank of any record in the list. This ability to efficiently compute the rank of the data record in the LRU list reduces the frequency with which the computationally-expensive initialization operation must be executed on the LRU list.

20 Claims, 5 Drawing Sheets

METHOD AND APPARATUS FOR EFFICIENTLY DETERMINING RANK IN AN LRU LIST

BACKGROUND

1. Field of the Invention

The present invention relates to techniques for efficiently determining the rank of items in a least-recently-used (LRU) list. More specifically, the invention relates to techniques for managing an LRU list so that the rank of data records in the list can be found efficiently, thereby reducing the frequency with which the list must be traversed and re-initialized.

2. Related Art

Caching techniques strive to provide rapid data access by loading frequently-used data from slower, large-capacity storage into faster cache memory. Since cache memories are typically much faster and smaller than the large-capacity storage, program performance depends heavily on the organization and functional behavior of the cache.

The choices of cache size and replacement strategy are key to cache performance. Temporal and spatial locality of data access have led to the common use of an LRU (least-recently-used) replacement strategy, where the item which was used least-recently is displaced when a new item is added to the cache.

However, determination of the ideal cache size remains a challenge. Currently, the best strategy for determining cache size involves simulating cache performance across a set of workloads. Since the volatility of the cache as a function of its size is an important consideration, such simulations must typically be run multiple times with varying cache sizes in order to generate statistically-meaningful hit rates. These simulation runs can be time-consuming, since the caches may be large and the system must track the previous access for every item in the cache. Furthermore, if the simulation tracks accesses using an LRU list, the process of managing such an LRU list requires constant maintenance of an ordered list of items, and a significant portion of the entire list may require re-enumeration upon every data access. As a result, list management and lookup operations consume a substantial portion of the simulation time.

Hence, what is needed is a method and an apparatus for managing an LRU list, such that the rank, or position, of data records can be determined efficiently.

SUMMARY

One embodiment of the present invention provides a system that manages an LRU list such that the rank of data records in the list can be determined efficiently. The system represents the list as a sequence of data records, wherein the record's position in the sequence is its rank. Each record contains an index field which is used to determine the rank, and the system initializes these fields by stepping through the list and setting each record's index field to the initial rank. When a record is accessed, the system moves it to the beginning of the list and appends the value of the record's index field to a "change list." The system then sets the index field of the record to zero. The system uses the change list to track which records have moved to the beginning of the list since the last initialization. The change list and the records' index fields can be combined to efficiently compute the rank of any record in the list. This ability to efficiently compute the rank of the data record in the LRU list reduces the frequency with which the computationally-expensive initialization operation must be executed on the LRU list.

In a variation on this embodiment, the system uses the data record's index field and the change list to efficiently compute the rank of any data record whose index field does not contain a zero value. First, the system sets a counter to the value of the data record's index field. Then, the system compares the value of the data record's index field to every value in the change list. For every comparison in which the value in the data record's index field is smaller than a value in the change list, the system increments the counter. After the index field has been compared to every value in the change list, the counter contains the rank of the data record.

In a variation on this embodiment, the system uses the data record's index field and the change list to efficiently compute the rank of any data record whose index field contains a value of zero. In this case, the system determines the record's rank by counting the number of preceding data records in the LRU list.

In a variation on this embodiment, the system uses a histogram to track how often each rank in the LRU list is accessed. The system uses the histogram to determine a set of hit rates in parallel for all LRU lists smaller than or equal to the size of the current LRU list, which enables the system to efficiently determine optimal LRU list size.

In a variation on this embodiment, the system tracks the cost of computing the rank of the data record in the LRU list while monitoring the cost and frequency of operations on the LRU list and change list. This makes it possible to detect when the cost of computing ranks compares unfavorably to the cost of re-initializing the entire list, and if so, to prompt the re-initialization of all of the record index fields.

In a variation on this embodiment, the system accesses data records using two doubly-linked lists. The system uses the first doubly-linked list to traverse data records by order in the LRU list. The system accesses the second doubly-linked list via a hash table, which allows traversal of data records based on data values contained in the records.

In a variation on this embodiment, the system is used to obtain LRU rankings for a cache simulation.

In a variation on this embodiment, the system is used to manage LRU lists in a set of linked LRU lists. This set of linked LRU lists can exploit locality more efficiently by optimizing operations that occur near the beginning of the LRU list. The set of linked LRU lists can also be pre-seeded to match a desired statistical distribution.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Simple LRU List Management

The goal of cache simulation is to find the distribution of hits in the LRU list while executing an instruction trace. The two parameters which are typically varied during this process are the size of the list and the number of instructions processed.

Figure 1:
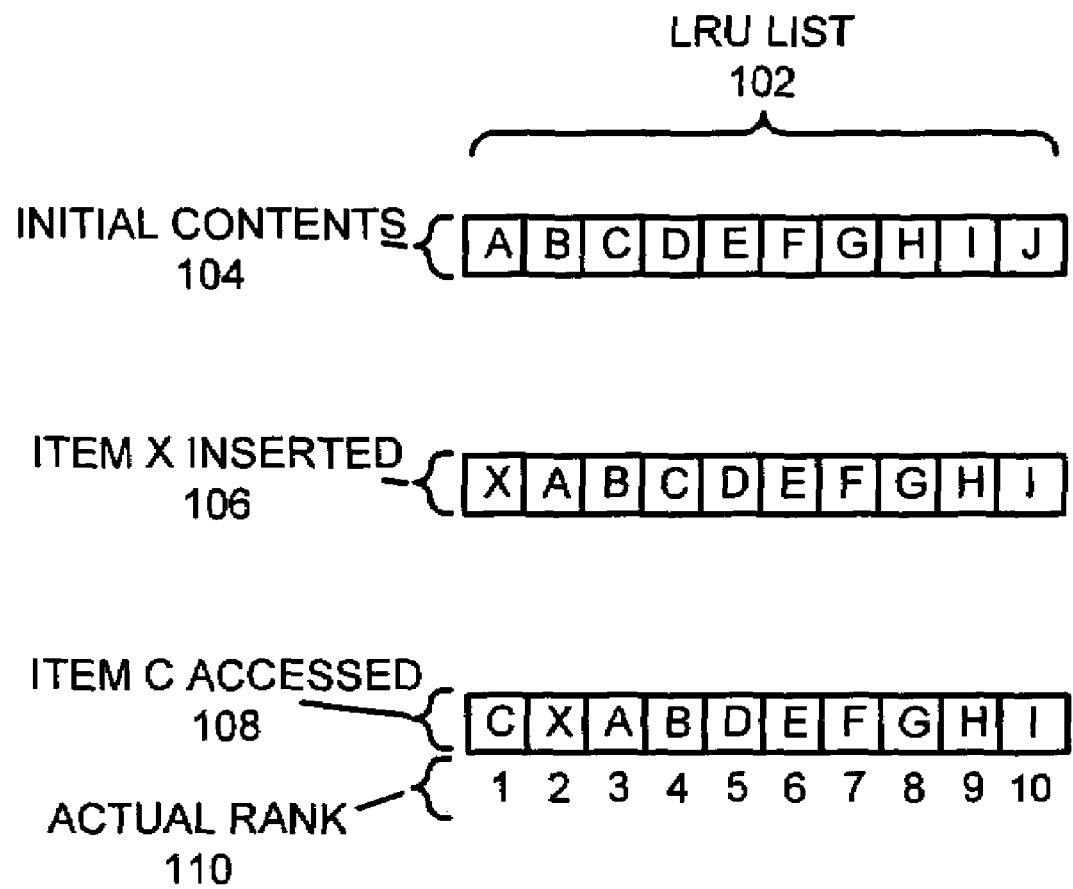
FIG. 1 illustrates an example of an LRU list during a simulation in accordance with an embodiment of the present invention.

FIG. 1 illustrates an example of an LRU list 102 during a cache simulation. In this example, the list of stored values is 10 items long, and does not contain any duplicates. Furthermore, the simulation uses the LRU protocol to replace items. Following the rules of an LRU replacement policy, every newly accessed data block is pre-pended to the front of the list. If the accessed block was not already in the list, another block is displaced.

After running for an initial time interval, the list contains the initial contents 104 shown. Then, an item 'X' is accessed. Since 'X' is not in the list, 'X' is inserted 106 at the front of the list, and the least-recently-used item, 'J', is removed. Upon subsequently accessing the item 'C' 108, the system finds that 'C' is already in the list, and moves 'C' to the beginning of the list without removing any items from the list.

The rank of an item in the list can be determined by counting the position from the front of the list, starting with the number one, as shown by the actual rank 110. A naïve method of finding the rank involves counting while searching from the beginning of the list for the desired item. For large lists this is clearly an undesirable option, because the number of comparisons scales linearly with the size N of the list. Some efficiency gains can result from using a hash-key to quickly find the correct record before re-computing ranks up to the former location of that record. This more-efficient approach scales with N/2, but still spends a significant amount of time re-initializing parts of the list.

An Efficient Scheme for the Management of LRU Lists

In the simple scheme above, moving an entry to the front of the list invalidates any rank information between the location of that record and the front of the list. A more efficient scheme takes advantage of the observation that incrementing the ranks of the records in that range would yield the same resulting ranks and require less computation. Change information can be stored to reduce the cost of determining record rank so that the rank of any record in the LRU list can be reconstructed using a change list and a per-record index field value.

Figure 2:
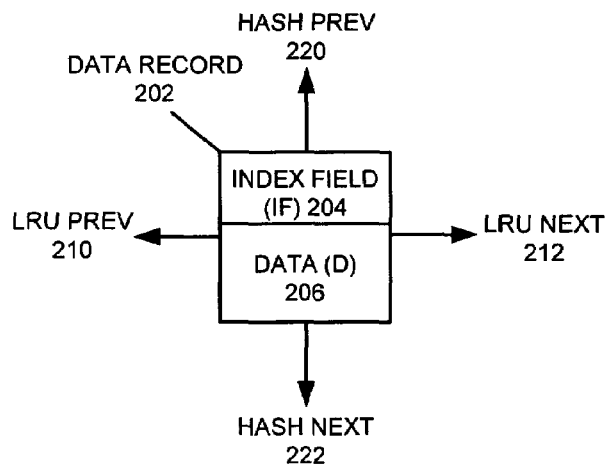
FIG. 2 illustrates a data record in the LRU list in accordance with an embodiment of the present invention.

FIG. 2 illustrates a data record 202 in the LRU list. Data record 202 contains an index field (IF) 204 in addition to the data (D) 206 being operated upon by the program. Each record also includes two sets of pointers to facilitate accesses via two doubly-linked lists. The LRU prev and next pointers (210-212) allow traversal of records by order in the LRU list, while the hash prev and next pointers (220-222) allow traversal via a hash indexing scheme based on the data contained in the records.

Figure 3:
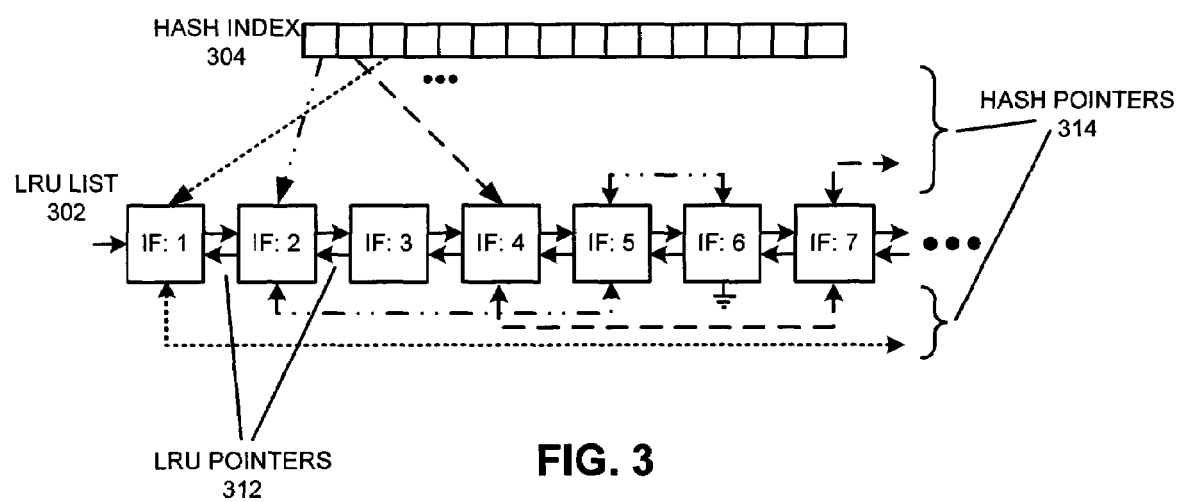
FIG. 3 illustrates the hash and LRU list structures in accordance with an embodiment of the present invention.

FIG. 3 illustrates the hash list and LRU list structures. Note that the data records of the LRU list 302 are connected by the LRU pointers 312. When a data block is accessed by the program, the system determines the correct entry in the hash index 304, and then follows the hash pointers 314 to find the matching record. The doubly-linked hash list makes it possible to access a record via the LRU list while still being able to easily fix or update the hash lists, for instance when the last item in the LRU list is deleted.

Figure 4A:
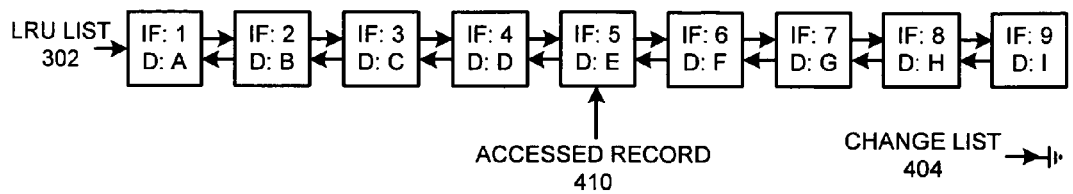
FIG. 4A illustrates a first step in a sequence of data access and rank computation operations executed on the LRU list in accordance with an embodiment of the present invention.

FIGS. 4A-D illustrate a method of list management and rank computation. In this example, FIG. 4A illustrates an initialized LRU list. (Note that initializing the LRU list involves stepping through the LRU list from the beginning and setting the value of each record's IF to the rank of the record.) The change list 404 is initialized to be empty. The first exemplary operation on the list is to access a record (410) containing the data item E (D: E).

Figure 4B:
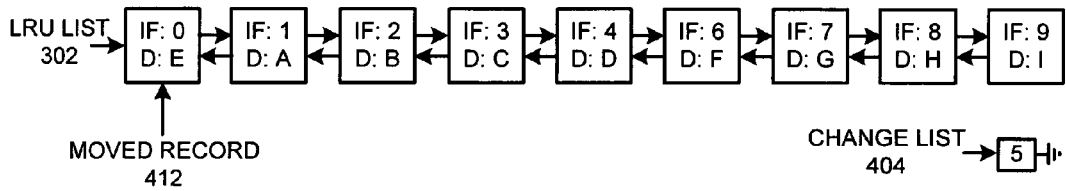
FIG. 4B illustrates a second step in a sequence of data access and rank computation operations executed on the LRU list in accordance with an embodiment of the present invention.

FIG. 4B illustrates the result of the data access operation. Note that the record is moved (412) to the front of the LRU list and the pointers are updated. Furthermore, the IF value for the moved record, '5', is added to the change list, and the IF field in the record is set to zero.

Figure 4C:
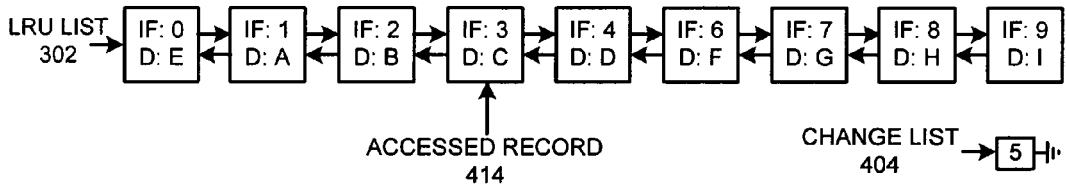
FIG. 4C illustrates a third step in a sequence of data access and rank computation operations executed on the LRU list in accordance with an embodiment of the present invention.
Figure 4D:
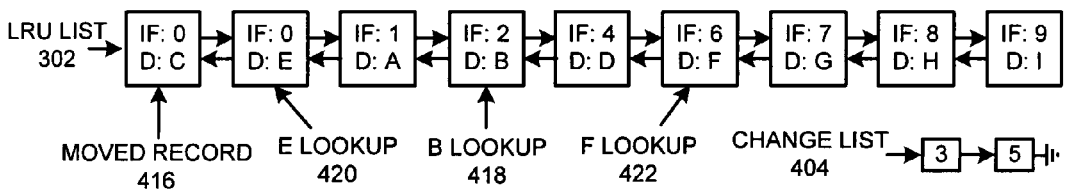
FIG. 4D illustrates a fourth step in a sequence of data access and rank computation operations executed on the LRU list in accordance with an embodiment of the present invention.

FIG. 4C illustrates a subsequent record access (414) of the data value C (D: C). FIG. 4D illustrates the corresponding move of the accessed record to the front of the list (416), the addition of the IF value of the moved record ('3') to the change list, and the following zeroing-out of the IF.

Rank Computation

Figure 5:
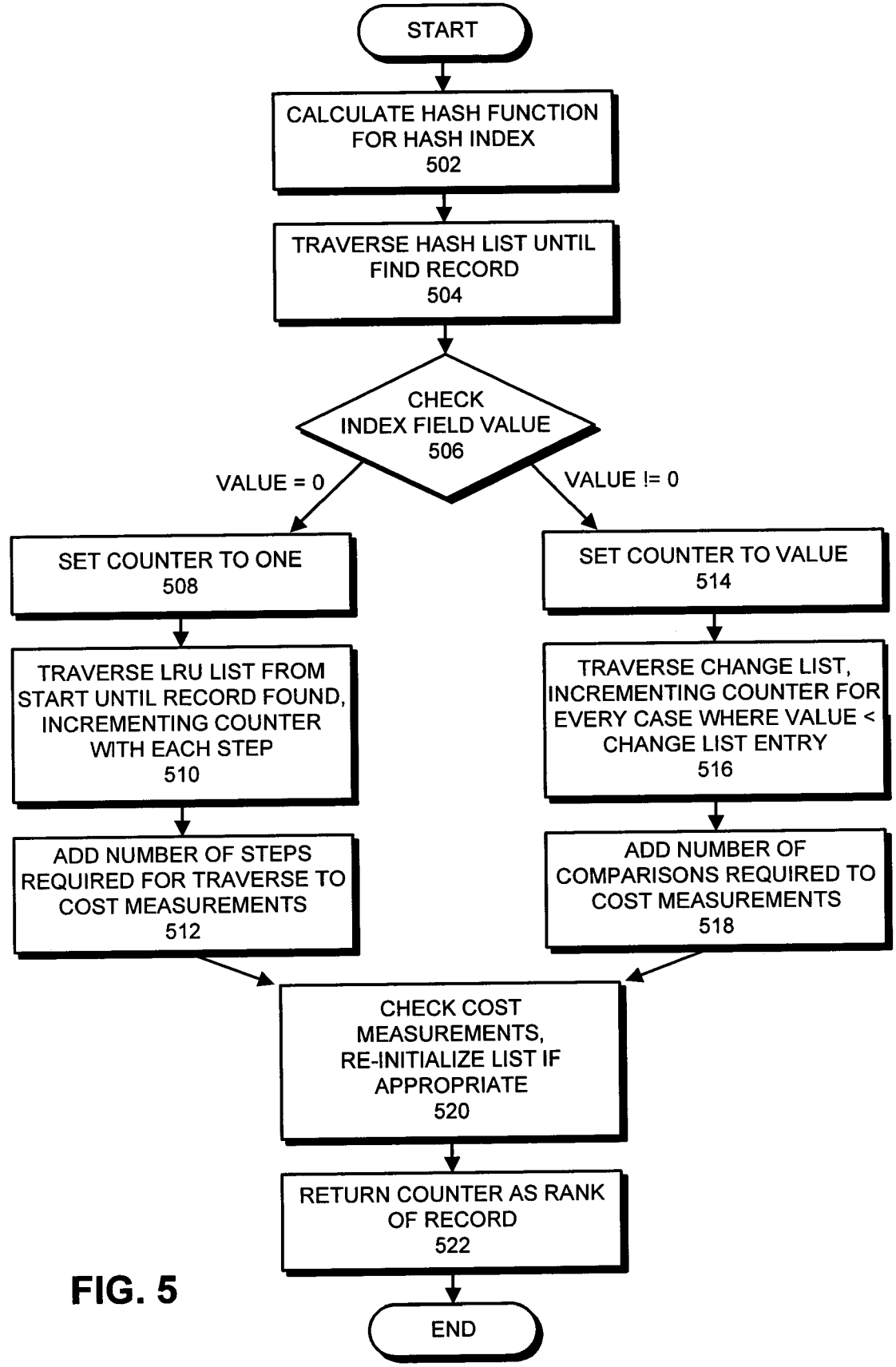
FIG. 5 presents a flow chart illustrating the process of determining the rank of a data record in the LRU list in accordance with an embodiment of the present invention.

FIG. 5 contains a flow chart that illustrates the process of determining the rank of a data record in the LRU list. The first step calculates the hash function for data block to determine the index into the hash index (step 502), and then traverses the resulting hash list until the corresponding record is found (step 504). The value of the record's IF is checked (step 506), to determine if the value is zero or non-zero. In the case that the value is zero, a counter is set to one (step 508). The LRU list is then traversed from the beginning, incrementing the counter with each step, until the record is found (step 510). The number of steps required for the traversal is then added to the cost measurements (step 512).

In the case that the value in step 506 is non-zero, the counter is set to that value. The system then traverses the change list comparing the IF value to each change list entry (step 516). For each comparison, if the IF value is smaller than the change list entry, the counter is incremented. The number of comparisons required is then added to the cost measurements (step 518). In step 520, the cost measurements are checked to see if the LRU list should be re-initialized. At the end of this process (step 522), the counter contains the rank of the record in the LRU list.

The example in FIG. 4D can be used to illustrate the rank computation process using the values contained in the IF field of a record and the change list. To compute the rank of the record containing data B (418, D: B), the record is first found using the hash index and hash pointers. When the record is found, a counter is set to the value of the IF, in this case '2'. The value of the IF is then compared to every value in the change list, and the counter incremented when the IF value is smaller than a value in the change list. Since '2' is smaller than both '3' and '5' in the change list, the final value of the counter is '4', which is returned as the correct rank of the record. For the case of the record containing F (422, D: F), the IF value is larger than both values in the change list, the value in the counter is not incremented, and the value of '6' is returned for the rank. In the case that the value for the IF of the desired record is zero, the record must be in the set of records at the front of the list, so the rank can be computed by counting from the front of the LRU list until the desired record is found. For instance, for the rank computation of the record containing E (420, D: E), counting the preceding data records would result in the computation of a rank of '2'.

The change list simplifies record rank computation by maintaining a representation of the changes made to the LRU list since initialization. Since a record's rank is computed based on the position it was taken from (as described by the index field) and changes recorded in the change list, the rank ordering of the list must only be recalculated when an element with IF of zero is encountered or the change list grows beyond a predetermined size. More specifically, since the index field indicates the position of the record at the last initialization, it can be used in conjunction with the change list to quickly regenerate the current rank. The result is a method that provides the correct rank ordering at all times, and for well-chosen change list sizes greatly reduces the time needed to determine rank. Since the worst-case LRU always re-enumerates the list, this method will always offer a speed improvement.

Parallel Computation of Hit Rates

The scheme described for managing LRU lists is especially beneficial in that it allows the simultaneous simulation of any cache smaller than or equal to the size of the LRU list in parallel. Extensive bookkeeping and a histogram are used to track where in the LRU list items are accessed. At the end of the simulation, the hit rate for a certain cache size is determined by comparing the proportion of hits in the histogram for ranks smaller than or equal to the cache size to the number of accesses. Thus, the system can simulate a set of cache sizes in one pass without slowing down the simulation. The resulting method, made possible by falling memory costs and the observation that additional memory usage can be leveraged to increase the speed of cache simulation, can greatly speed up cache simulations. Note that such techniques can also be applied to other areas, such as memory paging.

Comparing Look-Up and Re-Enumeration Cost Bookkeeping

At a certain point, the comparisons executed on the change list become similar in cost to re-initialization of the LRU list. Since the amount of work required to determine rank depends on the length of the LRU and change lists, the system maintains a set of counters that track relevant cost information. Costs that are tracked include: the length of recent initialization operations; the size of the change list; how often the change list has been searched when the index field has been zero and non-zero; and the traversal length to find records with zero IF values.

Some actions may have variable costs depending upon the technique used. For instance, a brute-force initialization of the entire LRU list would require roughly four operations per record. A variation based on an observation that the second half of the list rarely needs to be re-initialized might compare each rank during re-initialization, and halt the operation when the contents of the current index field are equal to the actual rank. Such a "smart" initialization does not operate on as many records as the brute force approach, but requires six operations per record. Historical cost information can be used to determine which approach would be more beneficial for simulation performance.

Maintaining detailed cost accounting records allows the system to determine the relative costs of rank computation in comparison to initialization, and to maintain the right balance between initialization-avoidance and high-performance.

Linked LRU Lists

Sometimes a single, large LRU list can perform poorly because of bias towards traversal over re-initialization. This can occur, for instance, when data accesses follow a Pareto distribution, in which the accesses are biased towards the front of the LRU list, and result in an unusually large number of traversals. In such a case, it may be desirable to execute more frequent initialization operations. The impact of these frequent initialization operations can be reduced by replacing the LRU list with a set of linked LRU lists.

Figure 6:
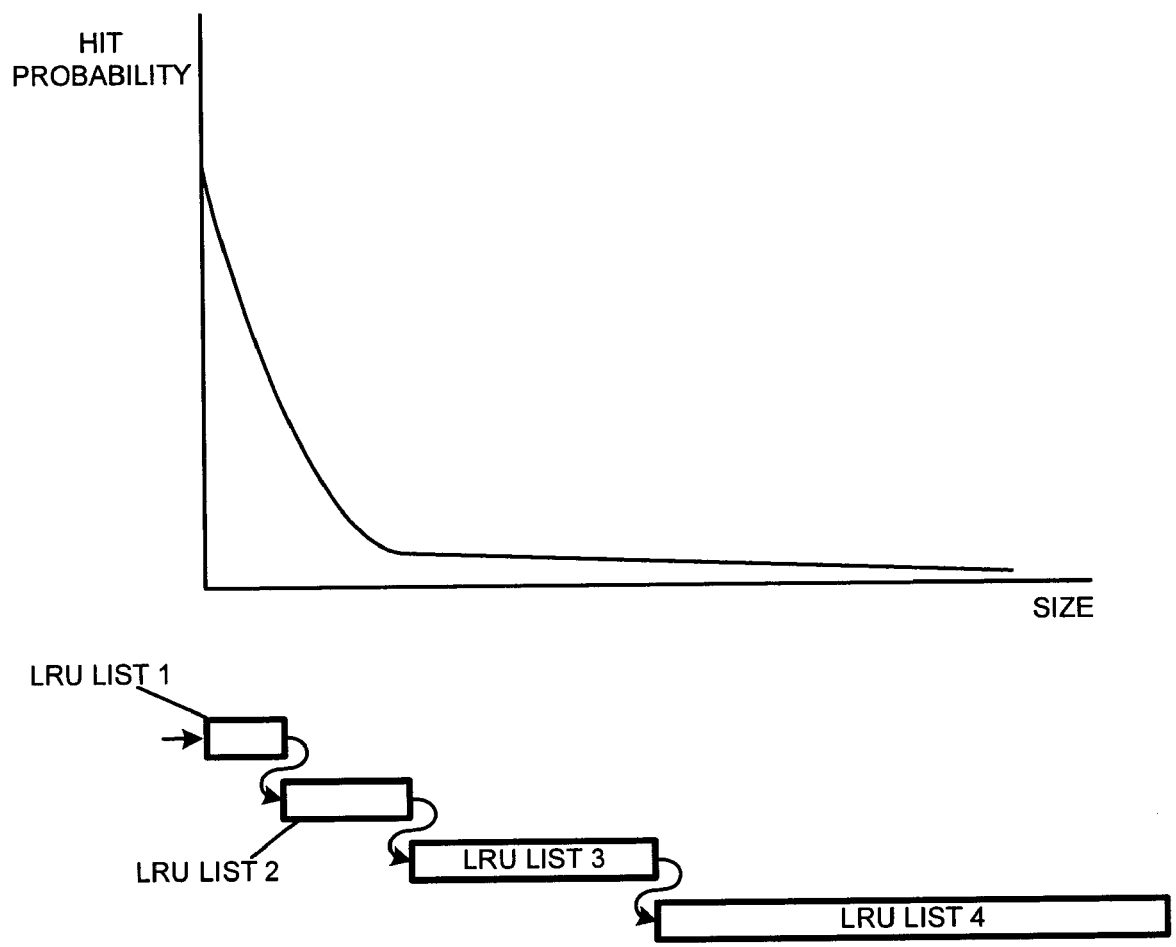
FIG. 6 illustrates a set of linked LRU lists that match a statistical distribution in accordance with an embodiment of the present invention.

FIG. 6 illustrates a set of linked LRU lists that match a statistical distribution. Such an organization can provide a more efficient distribution of LRU spaces and optimize the common case through exploitation of locality. The LRU levels, sizes, and order can be optimized for any a priori distribution desired, with each LRU in the set maintaining a separate change list and set of cost accounting data. Records contain an additional field indicating their current LRU list in addition to the index field.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing a least-recently-used (LRU) list, wherein the LRU list can be represented as a sequence of data records, wherein the position of a data record in the sequence is its rank, wherein the data record includes an index field which is used to determine the data record's rank, comprising:

initializing the sequence of data records, which involves stepping through the LRU list from the beginning and setting each data record's index field to the rank of the data record;

receiving an indication that a data record was accessed;

moving the accessed data record to the beginning of the LRU list;

appending the value of the accessed data record's index field to a change list, wherein the change list is a list of only the index fields of data records which have been accessed and which have moved to the beginning of the list since initialization;

setting the accessed data record's index field to zero;

wherein the accessed data record's index field and the change list can be used to efficiently compute the rank of any data record in the LRU list; and wherein the ability to efficiently compute the rank of any data record in the LRU list reduces the frequency with which computationally-expensive initialization operations must be executed.

2. The method of claim 1, wherein, if the value of a data record's index field is not zero, using the data record's index field and the change list to efficiently compute the rank of the data record involves:

setting a counter to the value of the data record's index field; and comparing the value in the data record's index field to every value in the change list and incrementing the counter every time the value in the data record's index field is smaller than a value in the change list;

wherein after the data record's index field has been compared to every value in the change list, the counter will indicate the rank of the data record.

3. The method of claim 1, wherein, if the value of the data record's index field is zero, using the data record's index field and the change list to efficiently compute the rank of any data record involves determining the data record's rank by counting the number of preceding data records in the LRU list.

4. The method of claim 1, wherein the method further involves:

using a histogram to track how often each rank in the LRU list is accessed; and using the histogram to determine in parallel a set of hit rates for all LRU lists smaller than or equal to the size of the LRU list;

wherein the set of hit rates can be used to efficiently determine an optimal LRU list size.

5. The method of claim 1, wherein the method further involves:

tracking the cost of computing the rank of the data record in the LRU list;

maintaining detailed bookkeeping of the cost and frequency of operations on the LRU list and change list; and initializing the LRU list if the cost of computing the rank of the data record in the LRU list compares unfavorably to the cost of initialization.

6. The method of claim 1, wherein the method further involves:

accessing the data record using two doubly-linked lists;

wherein a first doubly-linked list allows traversal of data records by order in the LRU list; and wherein a second doubly-linked list is accessed via a hash table, and allows traversal of data records based on data contained in the data record.

7. The method of claim 1, wherein the method is used for obtaining LRU rankings for a cache.

8. The method of claim 1, wherein the method is used to manage each LRU list in a set of linked LRU lists;

wherein the set of linked LRU lists can exploit locality more efficiently by optimizing operations occurring near the beginning of the LRU list; and wherein the set of linked LRU lists can be pre-seeded to match a statistical distribution.

9. A computer-readable storage device storing instructions that when executed by a computer cause the computer to perform a method for managing a least-recently-used (LRU) list, wherein the LRU list can be represented as a sequence of data records, wherein the position of a data record in the sequence is its rank, wherein the data record includes an index field which is used to determine the data record's rank, wherein the computer-readable storage device does not include computer instruction signals embodied in a transmission medium, and wherein the method comprises:

initializing the sequence of data records, which involves stepping through the LRU list from the beginning and setting each data record's index field to the rank of the data record;

receiving an indication that a data record was accessed;

moving the accessed data record to the beginning of the LRU list;

appending the value of the accessed data record's index field to a change list, wherein the change list is a list of only the index fields of data records which have been accessed and which have moved to the beginning of the list since initialization;

setting the accessed data record's index field to zero;

wherein the accessed data record's index field and the change list can be used to efficiently compute the rank of any data record in the LRU list; and wherein the ability to efficiently compute the rank of any data record in the LRU list reduces the frequency with which computationally-expensive initialization operations must be executed.

10. The computer-readable storage device of claim 9, wherein, if the value of a data record's index field is not zero, using the data record's index field and the change list to efficiently compute the rank of the data record involves:

setting a counter to the value of the data record's index field; and comparing the value in the data record's index field to every value in the change list and incrementing the counter every time the value in the data record's index field is smaller than a value in the change list;

wherein after the data record's index field has been compared to every value in the change list, the counter will indicate the rank of the data record.

11. The computer-readable storage device of claim 9, wherein, if the value of the data record's index field is zero, using the data record's index field and the change list to efficiently compute the rank of any data record involves determining the data record's rank by counting the number of preceding data records in the LRU list.

12. The computer-readable storage device of claim 9, wherein the method further involves:

using a histogram to track how often each rank in the LRU list is accessed; and using the histogram to determine in parallel a set of hit rates for all LRU lists smaller than or equal to the size of the LRU list;

wherein the set of hit rates can be used to efficiently determine an optimal LRU list size.

13. The computer-readable storage device of claim 9, wherein the method further involves:
   tracking the cost of computing the rank of the data record in the LRU list;
   maintaining detailed bookkeeping for the cost and frequency of operations on the LRU list and change list; and
   initializing the LRU list if the cost of computing the rank of the data record in the LRU list compares unfavorably to the cost of initialization.

14. The computer-readable storage device of claim 9, wherein the method further involves:
   accessing the data record using two doubly-linked lists;
   wherein a first doubly-linked list allows traversal of data records by order in the LRU list; and
   wherein a second doubly-linked list is accessed via a hash table, and allows traversal of data records based on data contained in the data record.

15. The computer-readable storage device of claim 9, wherein the method is used for obtaining LRU rankings for a cache.

16. The computer-readable storage device of claim 9,
   wherein the method is used to manage each LRU list in a set of linked LRU lists;
   wherein the set of linked LRU lists can exploit locality more efficiently by optimizing operations occurring near the beginning of the LRU list; and
   wherein the set of linked LRU lists can be pre-seeded to match a statistical distribution.

17. An apparatus for managing a least-recently-used (LRU) list, wherein the LRU list can be represented as a sequence of data records, wherein the position of a data record in the sequence is its rank, wherein the data record includes an index field which is used to determine the data record's rank, comprising:
   an initialization mechanism configured to initialize the sequence of data records by stepping through the LRU list from the beginning and setting each data record's index field to the rank of the data record;
   a receiving mechanism configured to receive an indication that a data record was accessed;
   a movement mechanism configured to move the accessed data record to the beginning of the LRU list;
   an appending mechanism configured to append the value of the data record's index field to a change list, wherein the change list is a list of only the index fields of data records which have been accessed and which have moved to the beginning of the list since initialization;
   a reset mechanism configured to set the accessed data record's index field to zero; and
   a computation mechanism configured to use the accessed data record's index field and the change list to efficiently compute the rank of any data record in the LRU list;
   wherein the ability to efficiently compute the rank of any data record in the LRU list reduces the frequency with which the computationally-expensive initialization operation must be executed.

18. The apparatus of claim 17, wherein, if the value of a data record's index field is not zero, the computation mechanism is configured to:
   set a counter to the value of the data record's index field; and to
   compare the value in the data record's index field to every value in the change list and increment the counter every time the value in the data record's index field is smaller than a value in the change list;
   wherein after the data record's index field has been compared to every value in the change list, the counter will indicate the rank of the data record.

19. The apparatus of claim 17, wherein, if the value of the data record's index field is zero, the computation mechanism is configured to use the data record's index field and the change list to efficiently compute the rank of any data record by counting the number of preceding data records in the LRU list.

20. The apparatus of claim 17, wherein the apparatus further includes:
   a generation mechanism configured to generate a histogram that tracks how often each rank in the LRU list is accessed; and
   a determination mechanism configured to use the histogram to determine in parallel a set of hit rates for all LRU lists smaller than or equal to the size of the LRU list;
   wherein the set of hit rates can be used to efficiently determine an optimal LRU list size.

* * * * *